July 28, 1970

J. J. PARKER 3,521,906

FRAME FOR AGRICULTURAL IMPLEMENT

Filed Dec. 16, 1968

INVENTOR.
J. J. PARKER

United States Patent Office 3,521,906
Patented July 28, 1970

3,521,906
FRAME FOR AGRICULTURAL IMPLEMENT
Jimmy Jay Parker, Des Moines, Iowa, assignor to Deere & Company, Moline, Ill., a corporation of Delaware
Filed Dec. 16, 1968, Ser. No. 783,847
Int. Cl. B62d 53/00
U.S. Cl. 280—413                                   11 Claims

ABSTRACT OF THE DISCLOSURE

A flexible multiple section implement frame in which the outrigger sections can be folded around behind the main section for highway transport. The outrigger sections have horizontal hinge lines which permit flexibility and are also pivoted about vertical axes established on the main section inboard of the rear and ends of the main section. The outrigger sections are movable to a trailing transport position by disconnecting them from the main section in the proximity of he horizontal hinge lines, swinging them about the vertical axes, and connecting them to the rear of the main section.

BACKGROUND OF THE INVENTION

This invention relates generally to improvement in agricultural implements such as cultivators, chisel plows and the like, and more particularly relates to flexible multiple section frames for carrying earth-working tools in which the outrigger sections of the frame can be folded rearwardly around behind the main section of the frame to a trailing transport position.

Of all the presently available designs for narrowing agricultural implements for highway transport, there is no single design suitable for use on both drawn and integral implements. Designs in which outrigger sections are pivoted vertically to an upright position and carried by a main section are not well suited for use on integral implements since, when in a transport position, they place excessive weight on the rear of the tractor and create a danger of upending the tractor. Designs which propose to transport the implements endwise have the disadvantage, when used on integral implements, of requiring transport wheels which are used only during the relatively short period when the implements are being transported. Designs in which outrigger sections are pivoted horizontally to a position in which they trail behind a main section appear most promising for use on both drawn and integral implements, but, until the present invention, there were no such designs which provided for a compact and stable implement in the transport position.

SUMMARY OF THE INVENTION

An object of the present invention is to provide an improved multiple section flexible implement frame having outriggers movable between transverse working positions and trailing transport positions, and in which the outrigger sections are as stable in the transport positions as in the working positions.

Another object of the invention is to provide a multiple section implement frame having outriggers foldable to trailing transport positions and in which the outrigger sections, when in the transport positions, are attached to the main section of the frame in a position closely adjacent to the rear of the main section of the frame to provide an easily transportable compact implement.

More specifically, it is an object of the invention to provide an implement having a main frame and outrigger frames in which a bracket is pivotally connected to one end of each outrigger frame and is optionally, releasably mounted to a side or the rear of the main frame, and in which each outrigger frame is also pivotal about a vertical axis mounted on the main frame in a position spaced from both the side and rear of the main frame so that by pivoting each outrigger frame about its vertical axis, it is moved between a first position in which the bracket thereon can be mounted to the side of the main frame and a second position in which the bracket thereon can be mounted to the rear of the main frame.

The above objects and additional objects and advantages will become apparent along with the details of construction of preferred embodiments of the invention from a reading of the following detailed description when taken in conjunction with the accompanying drawing.

DESCRIPTION OF THE PREFERRED EMBODIMENTS

Figure 1:
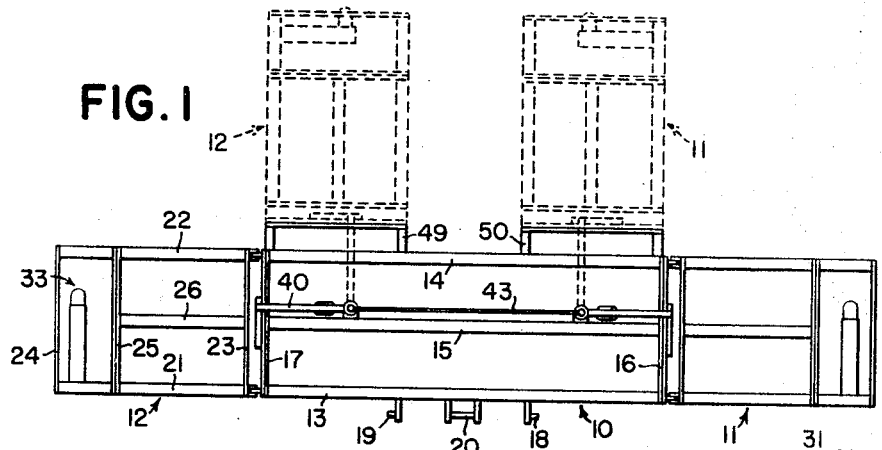
FIG. 1 is a top plan view of an implement frame constructed in accordance with the principles of the present invention, the dotted lines illustrating the outrigger sections of the frame in their transport positions.
Figure 2:
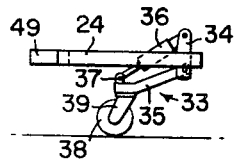
FIG. 2 is an elevational view of the left end of the implement frame illustrated in FIG. 1.
Figure 3:
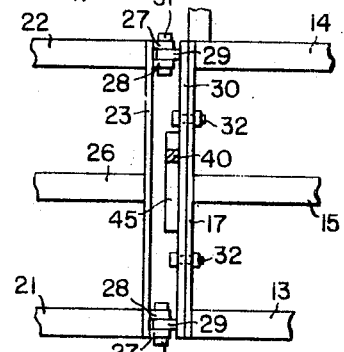
FIG. 3 is an enlarged plan view of the connection between the main section and one of the outrigger sections of the implement frame illustrated in FIG. 1.
Figure 4:
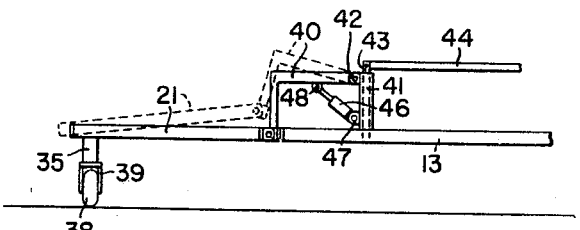
FIG. 4 is a front elevational view of the left half of the implement frame illustrated in FIG. 1, the dotted lines showing the outrigger section in a raised position to facilitate its pivotal movement between working and transport positions.

Referring now to the drawing, and in particular to FIGS. 1-4 wherein one preferred embodiment of the invention is illustrated, the implement frame consists of a main section indicated generally at 10 and a pair of outrigger sections indicated generally at 11 and 12. The main section 10 of the frame is made up of front, rear, and intermediate transversely extending frame members 13, 14 and 15, respectively, which are joined together at their ends by fore-and-aft extending frame members 16 and 17. The front tranversely extending frame member 13 carries a pair of lower spaced hitch pins 18 and 19 and an upper hitch pin 20 which are adapted to be connected to the power-operated three-point hitch of a tractor so that the main frame section 10 can be raised and lowered in the conventional manner. Although the illustrated main frame section is adapted to be integrally connected to a tractor, those skilled in the art will understand that the main frame section could be provided with vertically adjustable ground-engaging wheels and a draft tongue so that it could be drawn behind the tractor.

Although the outrigger frame sections 11 and 12 are not identical due to being positioned on opposite sides of the main frame section 10, they have completely corresponding parts and therefore only the left-hand outrigger frame section 12 will be described in detail. The outrigger frame section 12 is made up of front and rear transversely extending frame members 21 and 22 which are joined together at their ends by fore-and-aft extending frame members 23 and 24. The outrigger frame section 12 also has an intermediate fore-and-aft extending frame member 25 and an intermediate transversely extending frame member 26 which extends between frame members 23 and 25. As can best be seen in FIG. 3, two pairs of ears 27 and 28 are mounted on the fore-and-aft extending frame member 23 adjacent the ends thereof, and ears 29 on a bracket 30 extend between the ears 27 and 28. The bracket 30 is connected to the outrigger frame section 12 for movement about a horizontal hinge line by pivot pins 31 which extend through apertures provided in the ears 27, 28 and 29. The bracket 30 serves to mount the outrigger frame section 12 to the main frame section 10, and to this end is clamped the fore-and-aft extending frame member 17 on the main frame section 10 by bolts 32.

At its outer end, the outrigger frame section 12 is provided with a vertically adjustable ground-engaging wheel package indicated generally at 33. The wheel package 33 includes a bracket 34 mounted on the transversely extending frame member 21 intermediate the fore-and-aft extending frame members 24 and 25. The lower end of the bracket 34 pivotally carries the forward end of a wheel carrying arm 35. An extensible and retractable double-acting hydraulic cylinder 36 extends between and is connected to the upper end of the bracket 34 and a bracket 37 mounted on the trailing end of the arm 35. Hydraulic lines (undisclosed) will interconnect the cylinder 36 with conventional remote cylinder outlets on the tractor to which the implement is attached so that the cylinder 36 can be extended and retracted to raise and lower the trailing end of the arm 35 with respect to the outrigger frame section 12. The wheel 38 is carried between the arms of a fork 39 which in turn is rotatably mounted on and projects downwardly from the trailing end of the arm 35.

The outrigger frame sections 11 and 12 are also mounted to the main frame section 13 for pivotal movement about vertical axes so that they can be swung between transverse working positions as illustrated in full lines in FIG. 1 and trailing transport positions as illustrated by the dotted lines in FIG. 1. To this end, a right angle bracket 40 has its vertical leg fixedly secured to the bracket 30 and its horizontal leg pivotally attached to a rotatable sleeve 41 by a pivot pin 42. The sleeve 41 is rotatably mounted on a vertically extending shaft 43 which is mounted on the intermediate transversely extending frame member 15. The shafts 43 for the respective outrigger frame sections 11 and 12 have their upper ends interconnected by a rigid link 44 which helps maintain the shafts 43 in their upright position. The vertical leg of the right angle bracket 40 has a generally horizontally extending mounting bar 45 integral with its lower end, and the mounting bar 45 is fixedly secured to the bracket 30 in any suitable manner such as welding. When the bracket 30 is disconnected from the main frame section 10, the inner end of the outrigger frame section 12 can be raised by an extensible and retractable hydraulic cylinder 46 which extends between and is pivotally connected to a bracket 47 on the lower end of the rotatable sleeve 41 and a bracket 48 mounted intermediate the ends of the horizontal leg of the right angle bracket 40. The cylinder 46 will be interconnected with conventional remote cylinder outlets on the tractor to which the implement frame is connected.

When it is desired to move the outrigger frame sections 11 and 12 from the transverse working positions illustrated in solid lines in FIG. 1 to the trailing transport positions illustrated by the dotted lines in FIG. 1, the brackets 30 are disconnected from the main frame section 10 by removing the bolts 32. With the brackets 30 so disconnected, the cylinders 46 are extended to raise the inner ends of the outrigger frame sections to positions in which the brackets 30 are positioned above the main frame section 10 as illustrated by the dotted lines in FIG. 4. The outrigger frame sections 11 and 12 are then pivoted about the shafts 43 to the trailing transport positions, their inner ends are lowered by retraction of the cylinders 46, and the brackets 30 are then secured to the rear of the main frame section 10 by the bolts 32. Since the rear transversely extending frame member 14 of the main frame section 10 will have a number of earth-working tools (undisclosed) secured thereto, the brackets 30 cannot be secured directly to the frame member 14. Therefore, a pair of mounting brackets 49 and 50 are provided on the rear transversely extending frame member 14 and extend rearwardly a distance just sufficient to clear the clamps which will secure the earth-working tools to the frame member 14. The brackets 30 on the outrigger frame sections 11 and 12 are then bolted to the mounting brackets 49 and 50. The outrigger frame sections 11 and 12 are returned to their transverse working position by reversing the steps described above.

As can be seen from the foregoing, this invention provides a multiple section foldable implement frame in which the outrigger frame sections are easily moved between their working and transport positions and in which the outrigger frame sections are pivotally attached to the main frame section in both the working and transport positions. Also, by mounting the vertical pivot shafts 43 inboard of both the rear and sides of the main frame section 10, the horizontal hinge lines for the outrigger frame sections 11 and 12 are kept closely adjacent to the rear of the main frame section 10 to present an extremely compact implement in the transport position. Furthermore, by clamping the outrigger frame sections to the rear of the main frame section when in the transport positions, the outrigger frame sections will be just as stable in the transport positions as in their working positions.

Figure 5:
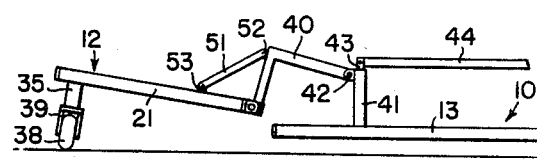
FIG. 5 is a view similar to FIG. 4 but illustrating a modified form of the invention.

A second embodiment of the invention is illustrated in FIG. 5, and with the exception of the means for raising the inner ends of the outrigger frame sections with respect to the main frame section is in every respect like the embodiment illustrated in FIGS. 1–4. The embodiment illustrated in FIG. 5 does not rely on hydraulic cylinders to raise the inner ends of the outrigger frame sections and is therefore well suited for use with a tractor which does not have sufficient remote cylinder outlets to take care of both the vertically adjustable wheels on the outrigger frame sections and also the cylinders used to raise the inner ends of the outrigger frame sections. In the embodiment illustrated in FIG. 5, the inner end of each outrigger frame section is raised with respect to the main frame section by making the pivoted bracket 30 rigid with the outrigger frame section. This is accomplished by a rigid link 51 extending between and connected to a first bracket 52 mounted on the right angle bracket 40 and a second bracket 53 mounted on the transversely extending frame member 26. The inner end of the outrigger frame section can then be raised with respect to the main frame section 10 by lowering the wheel 38 with respect to the outrigger frame section and also by lowering the main frame section 10 to the extent permitted by the tools mounted thereon to cause the outrigger frame section to pivot about the pin 42. The link 51 is secured to the brackets 52 and 53 by removable pins so that the link 51 can be removed when the pivoted bracket 30 is secured to the main frame section 10 to permit the outrigger frame sections to move about their horizontal hinge line in both the transport and working positions.

What is claimed is:

1. A frame for carrying agricultural implements comprising: a main frame section adapted to be connected to a propelling vehicle; an outrigger frame section; vertically adjustable ground-engaging wheel means on said outrigger section; bracket means pivotally connected to the outrigger section for swinging movement about a first horizontal axis; means releasably mounting the bracket means optionally to a side or the rear of the main section; support means mounted on the main section for pivotal movement about a vertical axis and positioned equal distances from the side and rear areas of mounting of the bracket means to the main section; rigid link means interconnecting the support means and the bracket means; and means for effecting relative vertical movement between the adjacent ends of the frame sections when the bracket means is released from the main frame.

2. The structure set forth in claim 1 wherein the link means has one end pivotally connected to the support means for movement about a second horizontal axis and the other end fixedly connected to the bracket means.

3. The structure set forth in claim 2 wherein the means for effecting relative vertical movement between the adjacent ends of the frame sections includes means for releasably locking the bracket means in a fixed position with respect to the outrigger section whereby, when the wheel means on the outrigger section are lowered with respect to the outrigger section, the link means will pivot about the second horizontal axis to raise the end of the outrigger section adjacent the main section with respect to the main section.

4. The structure set forth in claim 2 wherein the support means includes an upwardly extending shaft mounted on the main section and a sleeve rotatably mounted on the shaft, the link means is pivotally connected to the upper end of the sleeve, and the means for effecting relative vertical movement between adjacent ends of the frame sections includes an extensible and retractable hydraulic cylinder connected between the lower end of the sleeve and the link means intermediate its ends.

5. A frame for carrying earth-working agricultural tools comprising: a vertically adjustable main frame section; an outrigger frame section; means releasably connecting one side of the outrigger section optionally to a side or the rear of the main section in optional transverse or trailing relationship, respectively; vertically adjustable ground-engaging wheel means on the outrigger section adjacent the other end thereof; support means mounted on the main section for pivotal movement about a vertical axis; the support means being positioned inboard of the side and rear of the main section and equal distances from the side and rear areas of connection of the outrigger section to the main section; and rigid link means interconnecting the support means and the outrigger section; said link means being pivotally connected to the support means and fixedly connected to the outrigger section.

6. The structure set forth in claim 5 wherein the outrigger section includes a bracket means mounted on the one end thereof for pivotal movement about a horizontal axis, the bracket means is optionally connected to the side or rear of the main section, and the link means is fixedly connected to the bracket means.

7. The structure set forth in claim 6 and further including an extensible and retractable hydraulic cylinder having one end mounted on the support means and the other end connected to the link means intermediate its points of connection with the support means and the bracket means.

8. The structure set forth in claim 6 and further including means for releasably locking the bracket means in a fixed position with respect to the outrigger section.

9. The structure set forth in claim 5 in which a bracket is mounted on and extends rearwardly from the rear of the main section; and said outrigger section, when releasably connected to the rear of the main section in trailing relationship, is connected to the bracket.

10. A frame for carrying agricultural implements comprising: a main frame section and a pair of outrigger frame sections; means on the main section for connection with a propelling vehicle; ground-engaging wheel means on the outrigger sections; bracket means pivotally connected to one side of each outrigger section; means releasably mounting the bracket means optionally to the sides or rear of the main section in optional transverse or trailing relationship, respectively; a pair of spaced support means mounted on the main section for pivotal movement about vertical axes; rigid link means interconnecting each support means with one of the bracket means; each of the support means being positioned equal distances from the side and rear areas of mounting of the corresponding bracket means to the main section; and means for effecting relative vertical movement between adjacent ends of the frame sections when the bracket means are released from the main section.

11. The structure set forth in claim 10 in which a pair of brackets are mounted on the rear of the main section adjacent the ends thereof; each of the brackets extends rearwardly of the main section; and each of the bracket means, when releasably mounted to the rear of the main section, is mounted on one of the brackets.

References Cited

UNITED STATES PATENTS

| 3,162,459 | 12/1964 | Marmorine et al. | 280—413 X |
| 3,190,363 | 6/1965 | Morris | 172—311 X |
| 3,414,064 | 12/1968 | Foster | 172—311 |

LEO FRIAGLIA, Primary Examiner

U.S. Cl. X.R.

172—311